C. MASON.
VALVE.
APPLICATION FILED APR. 20, 1910.
999,239.
Patented Aug. 1, 1911.
2 SHEETS—SHEET 1.
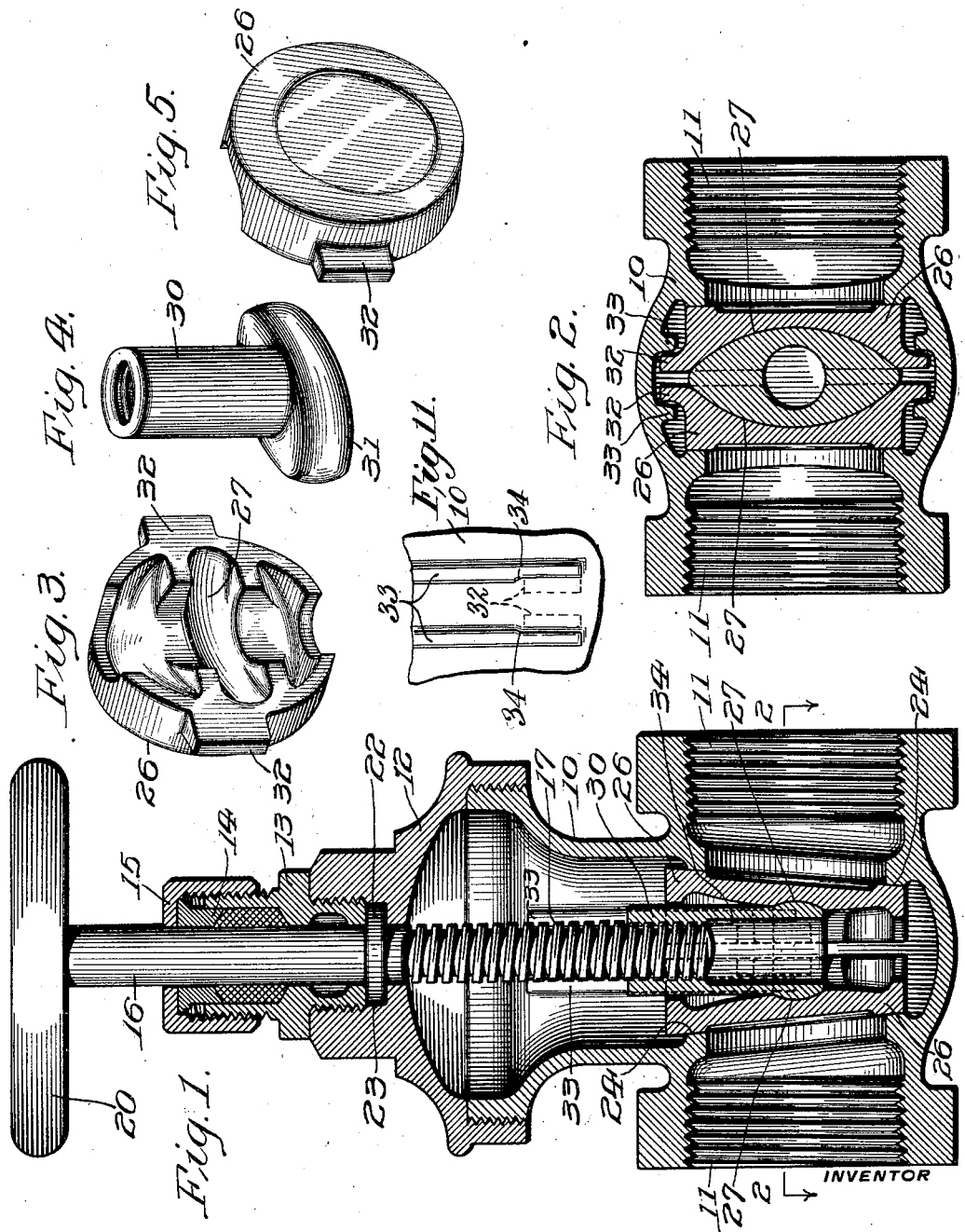

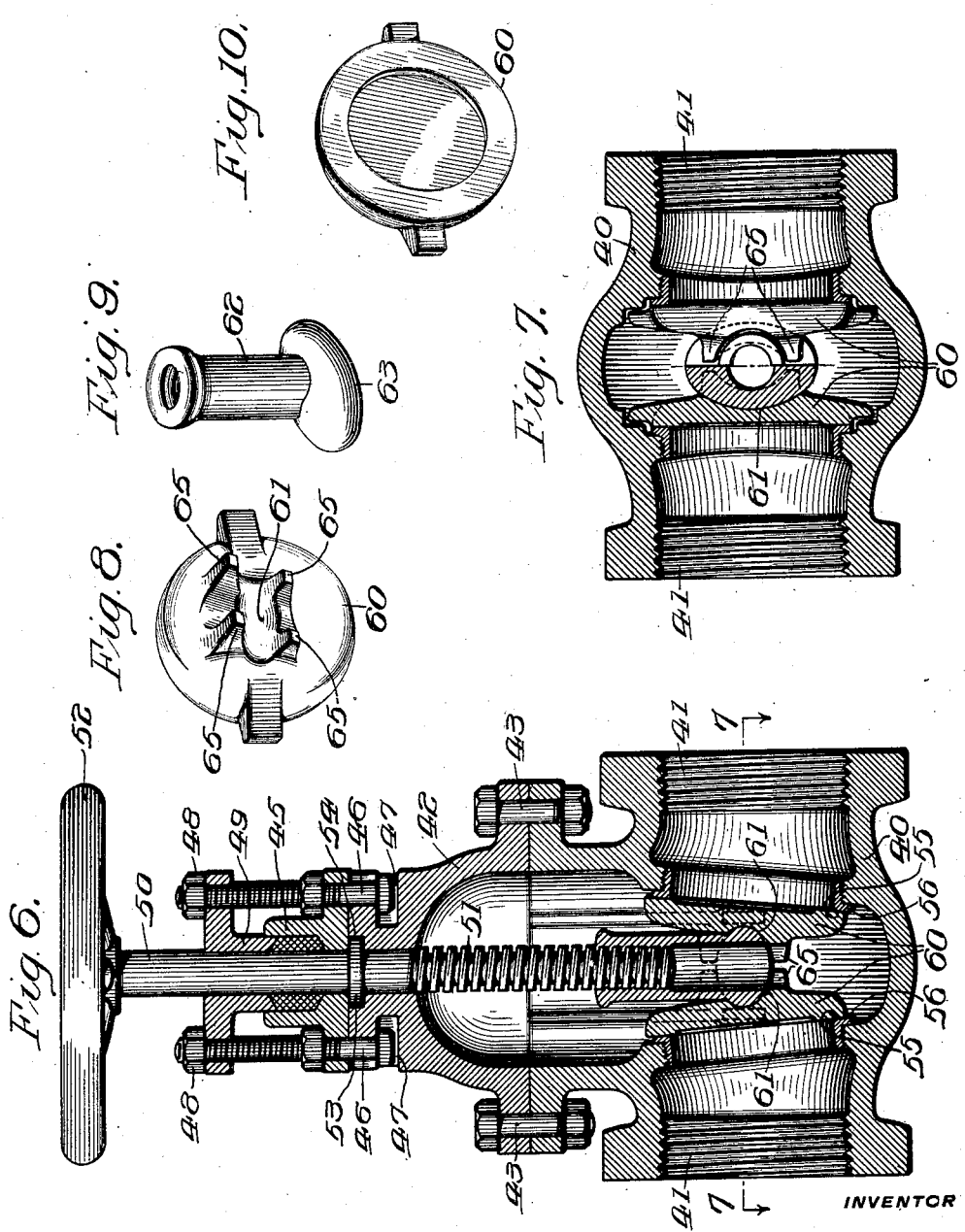

UNITED STATES PATENT OFFICE.

CARLISLE MASON, OF WYNDMOOR, PENNSYLVANIA, ASSIGNOR TO NELSON VALVE COMPANY, A CORPORATION OF PENNSYLVANIA.

VALVE.

999,239. Specification of Letters Patent. Patented Aug. 1, 1911.

Application filed April 20, 1910. Serial No. 556,520.

*To all whom it may concern:*

Be it known that I, CARLISLE MASON, a citizen of the United States, and a resident of Wyndmoor, county of Montgomery, and State of Pennsylvania, have invented certain new and useful Improvements in Valves, of which the following is a specification, reference being had to the accompanying drawings.

This invention particularly relates to gate valves of the class wherein the opposite faces of the gate are capable of relative movement, into different planes. In such valves it has been the practice to provide a spreader that is so formed as to bear upon the valve disk at a point or on a line, which affords a rocking movement of said disk thereon.

The principal objects of this invention are to provide a valve, with a gate comprising separate disks loosely supported for relative movement into different planes, and provided with opposed curved surfaces which conform to and slip upon the adjacent curved surfaces of a supporting wedge block or spreader, whereby a substantial rigidity is effected, and the desired flexibility afforded; to provide means to retain said disks in engagement with said spreader, and maintain their faces in substantially parallel relation with their seats when withdrawn therefrom, and to prevent the faces of said disks engaging said seats, until the axes of said disks are substantially alined with the axes of their respective seats; and to provide means to permit the spreading of said disks when thus alined.

The form of this invention hereinafter described provides a valve having oppositely inclined seats; a gate formed of separate disks having ellipsoidal sockets, arranged to be pressed into engagement with said seats by a wedge block or spreader having an ellipsoidal end snugly fitted in said sockets, to loosely support said disks in such slidable relation as to permit them to independently wabble, and thereby assume any plane which the valve seat may occupy; guides arranged to engage lugs on said disks to retain them in engagement with said spreader, and to maintain their faces in planes substantially parallel with their seats when withdrawn therefrom, said guides being provided with recesses disposed in such relation to the valve seat as to permit the relative expansion of the disks into engagement with their respective seats only when said disks have been shifted into alinement with said seats.

This invention includes the various novel features of construction and arrangement hereinafter more definitely specified.

In the accompanying drawings, Figure 1 is a central vertical longitudinal sectional view of a valve constructed in accordance with this invention; Fig. 2 is a plan sectional view of the valve shown in Fig. 1 taken on the line 2—2 in said figure; Fig. 3 is a perspective view of the inner face of one of the valve disks; Fig. 4 is a perspective view of the wedge block or spreader; Fig. 5 is a perspective view of the outer face of the other valve disk; Fig. 6 is a vertical longitudinal sectional view of a valve similar to the valve shown in Fig. 1 but embodying a slightly modified construction; Fig. 7 is a plan sectional view of the valve shown in Fig. 6, taken on the line 7—7 in said figure; Fig. 8 is a perspective view of the inner face of one of the valve disks shown in Fig. 6; Fig. 9 is a perspective view of the spreader; Fig. 10 is a perspective view of outer face of the other valve disk shown in Fig. 6; and Fig. 11 is a fragmentary detail view showing the recessed guides.

In said figures, the valve casing 10 has the opposite screw threaded ports 11, and is provided with the bonnet 12 in threaded engagement with said casing, and said bonnet carries the stuffing box 13, whose gland 14 is conveniently adjusted by the threaded cap 15. The valve stem 16 extends through said stuffing box 13 into the valve casing 10 and is provided with threads 17 disposed within said casing 10, and arranged to be rotated by the hand wheel 20. Said stem is prevented from longitudinal movement with respect to the casing by the engagement of the flange 22 with the socket 23, in the bonnet 12.

The valve casing 10 is provided with oppositely inclined seats 24, a reciprocatory gate is disposed between said seats and comprises separate disks 26, which have their opposed adjacent faces substantially parallel, and provided with central elongated ellipsoidal sockets 27, extending transversely and into which is snugly fitted the substantially T-shaped wedge block or spreader 30, which extends through apertures provided therefor in the periphery of said disks, and which has a substantially ellipsoidal head 31, whose surface conforms to the surfaces of said sockets 27, in said disks, and is snugly fitted therein.

The disks 26 are provided with laterally extending lugs 32, which are arranged to slide upon guides 33 when the gate is uplifted to the open position, and said guides retain said disks in engagement with the spreader, and maintain their outwardly directed faces substantially in parallel relation with their respective valve seats 24, and their opposed adjacent faces substantially parallel. Said guides are provided at their lower ends with recesses 34, in which the lugs 32 are disposed when said disks are shifted into alinement with their respective seats. Thus the faces of said disks are prevented from scraping upon their seats until they have been shifted inwardly to such a position as to engage said seats, to seal the passage therethrough.

In the form of valve shown in Figs. 6 to 10 inclusive, the valve casing 40 has the opposed screw threaded ports 41, and is provided with the bonnet 42, secured thereto by bolts 43 and provided with the separable stuffing box 45. The stuffing box 45 is secured to said bonnet by the bolts 46, which extend through slots 47 in said bonnet, and project upwardly, and are provided with nuts 48 arranged to adjust the gland 49, with respect to said stuffing box.

From the foregoing description it will be readily seen that it is impossible to improperly assemble the valve parts for the reason that the valve disks can only be placed in position with the spreader 30 with their faces tapering inwardly with respect to the valve casing 10.

The valve stem 50 extends through the stuffing box 45 and bonnet 42, and is provided with the threads 51, disposed within the valve casing, and arranged to be rotated by the hand wheel 52. Said stem is prevented from longitudinal movement by its flange 53, which is disposed in the socket 54 in said bonnet, and retained therein by the separable stuffing box 45.

The valve casing 40 has the oppositely inclined valve seats 55 provided with flanged facings 56 in screw threaded engagement therewith. Said seats are arranged to be engaged by the opposite faces of the gate, which comprises separate disks 60, which are provided with ellipsoidal sockets 61 arranged to receive the wedge block or spreader 62. Said spreader 62 is in threaded engagement with the valve stem 50 and comprises the ellipsoidal enlargement 63 whose surface conforms to the surface of the sockets 61 in said disks, and is snugly fitted therein. The disks 60 are also provided with lugs 65, which extend substantially perpendicular to the inner faces of said disks, and which embrace the enlargement 63 of said spreader, and snugly fit its surface.

It is to be observed that the surface of the spreader conforming to the surfaces of the sockets in the opposed disks is necessarily coincident with said surfaces, and therefore does not press upon any particular point or line, but bears upon the entire surface of said sockets uniformly, forming a substantially rigid structure, the separate parts of which are capable of relatively sliding upon the curved surfaces of the adjacent members into different planes parallel with the different positions of a gyratory plane.

In the construction above described, the flexibility of the disk mechanism compensates for any temporary or permanent distortion of the angles of the valve seats, that may be caused by strains or by expansion and contraction; furthermore, should any obstruction such as particles of dirt or grit accidentally get between the seat and one of said disks, the other disk will properly accommodate itself to its seat, and form a fluid tight joint. It may be noted that without any spreading device whatsoever other than the support upon which said disks are carried, they will automatically rock into any position required for seating, and thereby form a fluid tight joint. The form of valve above described is further advantageous in that any sediment which naturally collects in the pocket formed by the seats of the valve is pressed between the disks when they are closed, and carried by said disks when withdrawn therefrom, and by the rush of fluid through the valve, the sediment thus lifted is carried away.

It is not desired to limit this invention to the precise details of construction and arrangement herein set forth, as it is obvious that various modifications may be made therein without departing from the essential features of the invention as defined in the appended claims.

Having thus described my invention, I claim—

1. A valve having oppositely inclined seats, separate disks provided with sockets, a laterally elongated wedge block snugly fitted in contactual relation with the entire surface of said sockets and arranged to slide therein, and a stem in threaded engagement with said wedge block arranged to shift said disks into and out of engagement with said seats by engagement with the concave surface of said socket.

2. A valve having oppositely inclined seats, separate disks provided with horizontally elongated curved surfaces, a wedge-block having a surface substantially coextensive with said curved surfaces, and snugly fitted in slidable relation thereto to effect pressure throughout the extent of said curved surface, and a rotatable stem in threaded engagement with said wedge-block arranged to shift said disks into and out of engagement with said seats.

3. A valve having oppositely inclined seats, separate disks provided with sockets of ellipsoidal contour, a wedge-block having a head whose surface conforms to the sockets in said disks, and a stem in threaded engagement with said wedge-block, arranged to shift said disks into and out of engagement with their respective seats.

4. A valve comprising a casing having oppositely inclined seats, separate disks provided with ellipsoidal surfaces, a wedge-block conforming to the ellipsoidal surfaces of said disks, and a rotatable stem in threaded engagement with said wedge-block arranged to shift said disks into and out of engagement with said seats.

5. A valve comprising a casing provided with oppositely inclined seats, separate disks provided with complementary sockets substantially forming an ellipsoidal cavity, a wedge-block having a substantially ellipsoidal region fitted in said cavity, and having its surfaces substantially coincident with the surfaces of said cavity, and a rotatable stem in threaded engagement with said wedge-block arranged to shift said disks into and out of engagement with said seats.

6. A valve comprising a casing having oppositely inclined seats, a threaded stem arranged to rotate in said casing, a wedge block in threaded engagement with said stem, arranged to be reciprocated thereby, and having a region substantially forming an ellipsoid, separate disks supported by said ellipsoid and provided with sockets whose surfaces conform to the surface of said ellipsoid in slidable engagement therewith, and arranged to be engaged with and disengaged from said seats by the reciprocation of said wedge block, by which they are supported by the engagement of the ellipsoidal surfaces.

7. A valve comprising a casing having oppositely inclined seats, a threaded stem mounted to rotate in said casing, a wedge-block in threaded engagement with said stem and arranged to be reciprocated thereby, and comprising a region forming an ellipsoid, whose major axis extends transverse with respect to the axis of said seats, separate disks having sockets arranged to conform to said ellipsoid and supported thereby, the surfaces of said sockets being free to slide upon the surfaces of said ellipsoid, to assume different angles and thereby accommodate the faces of said disks to any position which said valve seat may occupy.

8. A valve comprising a casing provided with inclined seats, a threaded stem rotatable in said casing, a wedge-block in threaded engagement with said stem, arranged to be reciprocated thereby, and provided with a region forming an ellipsoid, whose major axis extends transverse with respect to the axes of said seats, separate disks having sockets whose surfaces conform to the curvature of said ellipsoid and free to slide thereon, and to rock into planes parallel with the different positions of a gyratory plane.

9. A valve comprising a casing having oppositely inclined seats, and guide-ways therein, a threaded stem rotatable in said casing, a wedge-block in threaded engagement with said stem and arranged to be reciprocated thereby, having an ellipsoid formed thereon whose major axis extends transverse to the axes of the said seats, separate disks provided with sockets whose surfaces conform to the surface of said ellipsoid, and provided with lugs arranged to engage said guides, to maintain said disks in engagement with said wedge-block, and in substantially parallel relation with their seats when shifted therefrom.

10. A valve comprising a casing having seats, separate disks provided with narrow elongated sockets extending across the opposed faces of said disks, and a substantially T-shaped wedge-block having its head fitted in said sockets to distribute the pressure across said disk, and arranged to permit the relative movement of said disks into different planes.

11. A valve comprising a casing having oppositely inclined seats, separate disks provided with elongated sockets extending substantially across the opposed faces of said disks and a substantially T-shaped wedge-block extending across the said disk and having bearing surfaces substantially conforming to the short arcs of two overlapping circles, fitted in said sockets and arranged to permit free relative movement of said disks, and to distribute the pressure thereon substantially to the periphery thereof.

12. A valve comprising a casing having opposed seats, and guides in said casing provided with abruptly formed recesses, a threaded stem rotatable in said casing, a spreader in threaded engagement with said stem, and provided with an enlarged curved portion, separate disks supported by said spreader, and having sockets arranged to conform to the curved surface of said enlarged portion, and provided with lugs arranged to engage said guides to retain said disks in engagement with said spreader, and maintain their faces in substantially parallel relation with said seats when shifted therefrom, said guides being arranged to maintain the faces of said disks from their respective seats until in proper alinement to engage said seats, when said lugs may enter said abruptly formed recesses.

13. A valve comprising a casing having opposed inclined seats, separate disks provided with recesses in their opposed faces, and a substantially T-shaped wedge block fitted in said sockets and having a bearing surface substantially conforming to the arcs of a common chord longitudinally and substantially conforming to a circle transversely.

14. A valve comprising a casing having opposed inclined seats, separate disks arranged to engage said seats, having elongated concave sockets therein, a spreader of such shape as to conform to the surfaces of said sockets, and arranged to loosely support said disks by engagement of said concave surface of said sockets, and means arranged to retain said disks in engagement with said spreader, and to maintain their faces in substantially parallel relation with said seats when shifted therefrom.

15. A valve comprising a casing having oppositely inclined seats, separate disks arranged to engage said seats, and provided with elongated concave sockets free from angles, a spreader arranged to support said disks, and having an enlarged portion thereof conforming to the surfaces of said sockets, and snugly fitted therein, in slidable relation therewith, means on said disks arranged to retain them in engagement with said spreader, and to maintain their faces in substantially parallel relation with said seats when disengaged therefrom, to prevent said disks from engaging said seats until alined therewith, in closed position.

16. A valve comprising a casing having seats, separate disks fitted to said seats and provided with recesses in their adjacent opposed faces, and a T-shaped spreader having its head disposed in said recesses, the sides of which conform to arcs of different centers and arranged to engage the walls of said recesses in said disks, throughout their extent.

17. A valve comprising a casing having opposed seats, separate gate disks fitted to said seats, and provided with elongated sockets having uninterrupted smooth surfaces throughout their extent, and a substantially T-shaped spreader fitted in slidable engagement throughout its lateral extent with said surfaces, and means to maintain said disks engaged with said spreader.

18. A valve comprising a casing having opposed seats, separate gate disks fitted to said seats, and provided with laterally elongated concave sockets having uninterrupted smooth surfaces, and a substantially T-shaped spreader whose surface conforms to the entire surface of said sockets in slidable engagement therewith.

In witness whereof I have hereunto set my hand this 13th day of April, A. D. 1910.

CARLISLE MASON.

Witnesses:
H. C. BAYNARD,
W. J. SPENCER.

---

Copies of this patent may be obtained for five cents each, by addressing the "Commissioner of Patents, Washington, D. C."